United States Patent
Mohaupt et al.

(10) Patent No.: US 6,765,305 B2
(45) Date of Patent: Jul. 20, 2004

(54) SENSOR-INDEPENDENT OSCILLATION AMPLITUDE CONTROL

(75) Inventors: Jens Mohaupt, Pliezhausen (DE); Johannes Artzner, Reutlingen (DE); Wolfram Bauer, Tuebingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/257,454

(22) PCT Filed: Mar. 17, 2001

(86) PCT No.: PCT/DE01/01032

§ 371 (c)(1), (2), (4) Date: Jan. 29, 2003

(87) PCT Pub. No.: WO01/77619

PCT Pub. Date: Oct. 18, 2001

(65) Prior Publication Data

US 2003/0151394 A1 Aug. 14, 2003

(30) Foreign Application Priority Data

Apr. 12, 2000 (DE) .......................... 100 18 226

(51) Int. Cl.[7] .............................. H02P 11/00
(52) U.S. Cl. .................. 290/1 R; 310/359; 323/201
(58) Field of Search ............... 290/1 R, 1 A; 323/201; 310/359, 316.01, 366

(56) References Cited

U.S. PATENT DOCUMENTS

| | | | |
|---|---|---|---|
| 5,511,419 A | 4/1996 | Dunn | 73/504.08 |
| 5,635,640 A | 6/1997 | Geen | 73/504.12 |
| 6,204,590 B1 * | 3/2001 | Audren et al. | 310/316.01 |
| 6,577,040 B2 * | 6/2003 | Nguyen | 310/309 |
| 6,583,534 B1 * | 6/2003 | Nakatsuka et al. | 310/359 |

FOREIGN PATENT DOCUMENTS

WO    WO 99 19734    4/1999

* cited by examiner

*Primary Examiner*—Nicholas Ponomarenko
(74) *Attorney, Agent, or Firm*—Kenyon & Kenyon

(57) ABSTRACT

A device is described for generating an electric voltage by which a body of a capacitive and/or inductive sensor capable of vibration, such as a capacitive micromechanical rotational rate sensor in particular, is induced to vibrate. In order to reduce the manufacturing cost of the sensor, a voltage generating device is provided which induces a constant mechanical deflection of the body capable of vibration, this deflection being independent of the manufacturing tolerances of the sensor.

14 Claims, 4 Drawing Sheets

US 6,765,305 B2

SENSOR-INDEPENDENT OSCILLATION AMPLITUDE CONTROL

FIELD OF THE INVENTION

The present invention relates to a device for generating an electric voltage.

BACKGROUND INFORMATION

A known rotational rate sensor produced by microsystem technology has an oscillating weight which oscillates about its axis of rotation. The oscillating weight has a comb structure, i.e., it is formed by a comb structure which alternately meshes with a first stationary comb structure and with a second stationary comb structure of the sensor as it oscillates. This arrangement forms two capacitors whose capacitances change in opposite directions over time. If the rotational rate sensor experiences a rotational rate perpendicular to the axis of torsional vibration of the oscillating weight, one side of the oscillating weight moves toward the substrate of the rotational rate sensor and the other side moves away from it. These changes in distance are measured capacitively by electrically conducting surfaces beneath the oscillating weight. The comb structures which are stationary with respect to the sensor and the comb structure which is provided on the oscillating weight are acted upon by an alternating voltage, thereby inducing oscillation of the oscillating weight.

To obtain a high signal-to-noise ratio of the test signal which represents the rotational rate, the deflection of the moving structure of the sensor must be maximized.

In the case of a known capacitive micromechanical sensor, such as a rotational rate sensor manufactured by planar silicon processes in particular, the change in capacitance depends not only on the deflection of the moving structure but also on the gap distance. Gap distance is understood to refer to the average distance between the "teeth" of the movable comb structure and the two stationary comb structures in the case of a stationary oscillating weight. Since the gap distance may vary from one sensor to the next due to the manufacturing technology, each sensor must be adjusted individually to achieve maximum deflection, i.e, maximum vibration amplitude of the movable structure. Not only is this complicated, but it may also result in the movable structure striking against the stationary structure, which could damage the sensor.

SUMMARY OF THE INVENTION

The device according to the present invention has the advantage over the related art in particular that, regardless of the manufacturing tolerances, it automatically adjusts a predefined deflection of the oscillating weight of a capacitive or inductive sensor. This eliminates individual manual adjustment of each sensor for setting a virtually maximum deflection of the oscillating weight in order to obtain a maximum signal-to-noise ratio. This makes it possible to manufacture capacitive and inductive sensors such as rotational rate sensors in particular less expensively.

DETAILED DESCRIPTION

Figure 1:
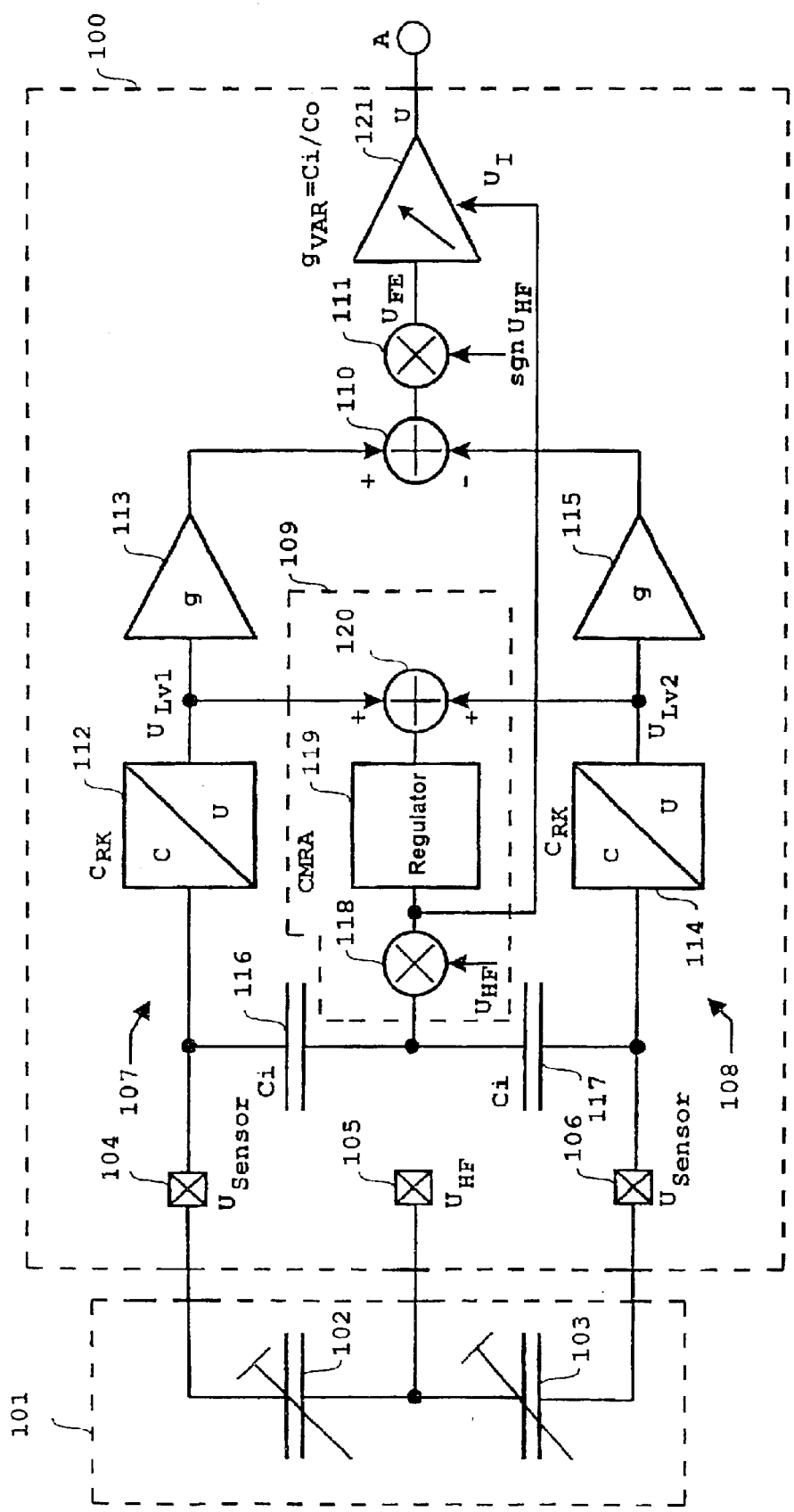
FIG. 1 shows the first part of a schematic diagram of a first embodiment of a sensor-independent vibration amplitude regulating device according to the present invention.
Figure 2:
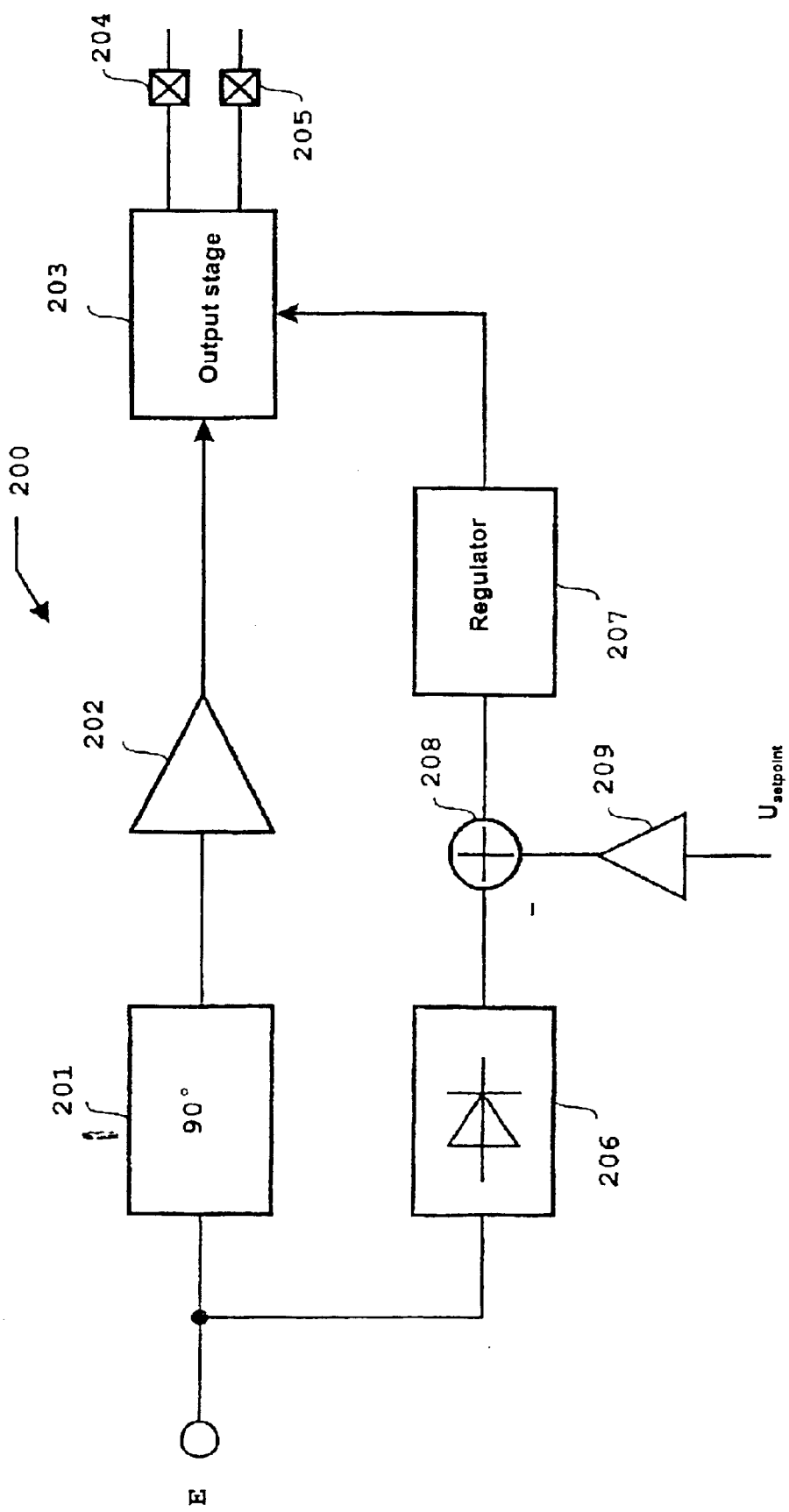
FIG. 2 shows the second part of the schematic diagram of the first embodiment of a sensor-independent vibration amplitude regulating device according to the present invention.
Figure 3:
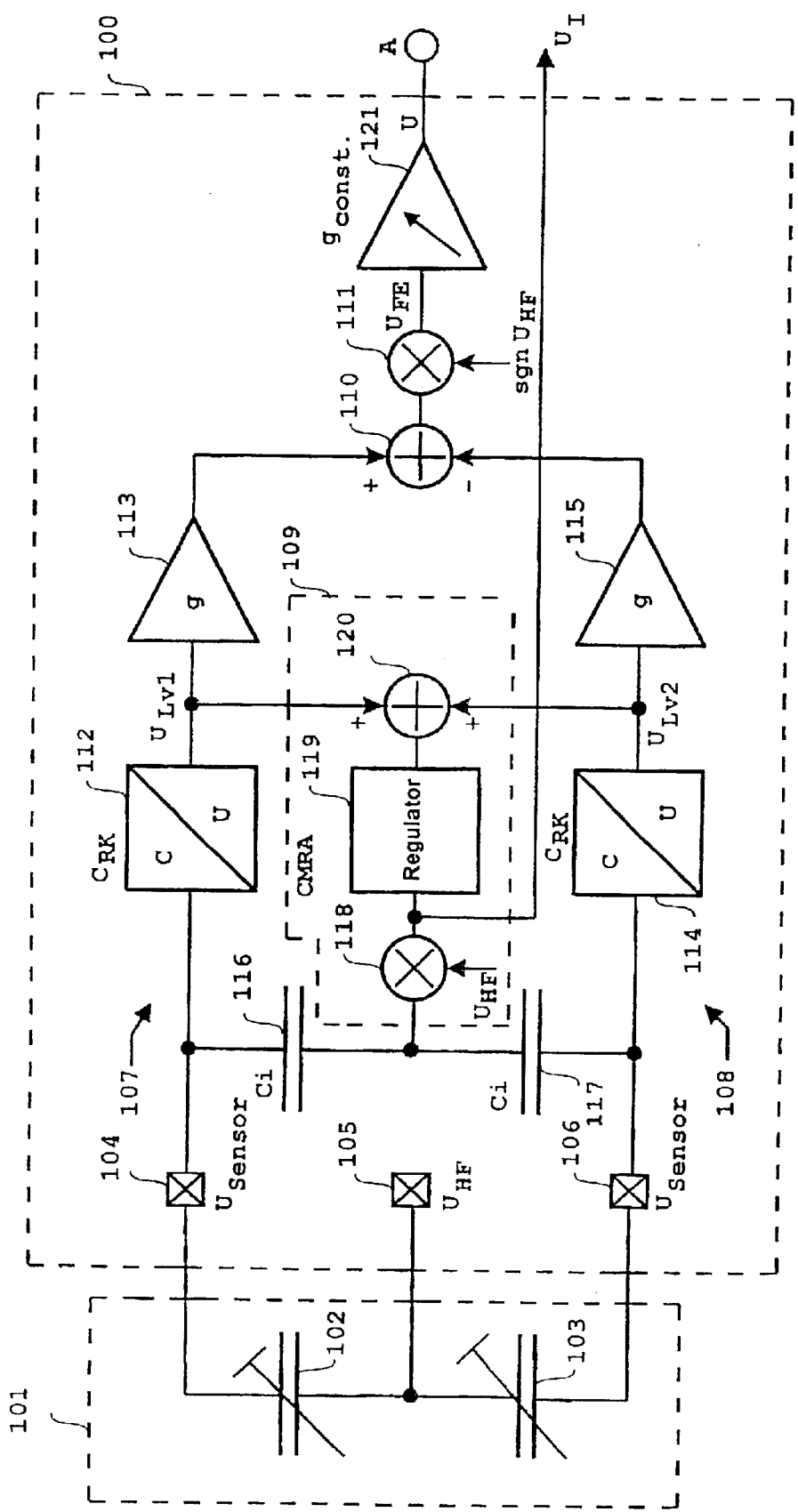
FIG. 3 shows the first part of the schematic diagram of the second embodiment of a sensor-independent vibration amplitude regulating device according to the present invention.

For the sake of simplicity, the schematic diagram of a sensor-independent vibration amplitude regulating device according to the present invention has been divided into FIGS. 1 and 2 plus 3 and 4. An output of a first part of the schematic diagram, labeled as A in FIGS. 1 and 3, is connected electrically to an input of a second part of the schematic diagram, labeled as E in FIGS. 2 and 4.

First part 100 of the schematic diagram of the first embodiment of the vibration amplitude regulating device according to the present invention, as illustrated in FIG. 1, shows at the left a schematic diagram 101 of another comb structure arrangement having a comb structure movable with the oscillating weight and two stationary comb structures of the type described above. These additional comb structures are used to sense the deflection of the oscillating weight. Diagram 101 shows two capacitors 102 and 103, which are formed by. the two comb structures, these comb structures being stationary with respect to the sensor and having the function of sensing the deflection, and by the movable comb structure oscillating between the two former comb structures.

Furthermore, first part 100 of the schematic diagram shows a first signal path 107, a second signal path 108, an adder 110, a demodulator 111, an amplifier 121 and a common-mode regulating apparatus 109.

First signal path 107 has a terminal 104, a C/U converter 112 and an amplifier 113. Terminal 104 is connected to the input of C/U converter 112, whose output is connected to the input of amplifier 113, and the output of amplifier 113 is connected to a first input of adder 110. In an identical manner, second signal path 108 has a terminal 106, a C/U converter 114 and an amplifier 115. Terminal 106 is connected to the input of C/U converter 114 whose output is connected to the input of amplifier 115, and the input of amplifier 115 is connected to a second input of adder 110. The output of adder 10 is connected to a first input of demodulator 111 and its output is connected to third input of amplifier 121.

C/U converters 112 and 114 are preferably optical amplifiers wired as inverting amplifiers having on-chip capacitance $C_{RK}$ in the feedback; these are charge amplifiers.

Common-mode regulating apparatus 109 (CMRA) has an adder 120, a regulator 119, preferably an I regulator, a modulator 118, a capacitor 116 having a capacitance $C_I$ and a capacitor 117 also having capacitance $C_I$. A first input of adder 120 is connected to the output of C/U converter 112, i.e., the input of amplifier 113, and a second input of adder 120 is connected to the output of C/U converter 114, i.e., the input of amplifier 115. The only output of adder 120 is connected to the input of regulator 119, and the output of regulator 119 is connected to both the input of modulator 118 and to a regulating terminal of amplifier 121.

The output of modulator 118 is connected to a first terminal of capacitor 116 and to a first terminal of capacitor 117. The second terminal of capacitor 116 is connected to the input of C/U converter 112, i.e., terminal 104, and the second terminal of capacitor 117 is connected to the input of C/U converter 114, i.e., terminal 106.

The second part of the schematic diagram of the first embodiment of the vibration amplitude regulating device of a rotational rate sensor, as shown in FIG. 2, shows input E connected to output A shown in FIG. 1, a phase quadrature device 201, an output stage 203, a terminal 204, a terminal 205, an adder 208, an amplifier 209, a rectifier 206 and a regulator 207, where regulator 207 forms part of an automatic gain control (AGC).

Input E of the second part of the schematic diagram of the vibration amplitude regulating device of a rotational rate sensor shown in FIG. 2 is connected to the input of the phase quadrature device 201, the output of phase quadrature device 201 being connected to the input of amplifier 202, the output of amplifier 202 being connected to an input of output stage 203, and one output of output stage 203 being connected to terminal 204 and another output of output stage 203 being connected to terminal 205. The input of phase quadrature device 201 is also connected electrically to the input of rectifier 206, whose output is connected to the first input of adder 208, whose output is in turn connected to the input of regulator 207, and finally, the output of regulator 207 is connected to an additional input of output stage 203. The second input of adder 208 is connected to the output of amplifier 209.

A setpoint voltage $U_{setpoint}$ is applied to the input of amplifier 209 and sets the desired maximum deflection of the oscillating weight for all sensors of the same type.

The function of the vibration amplitude regulation of a rotational rate sensor according to the present invention is described in detail below. It is assumed that the oscillating weight oscillates about its resting position.

The time-dependent capacitance (C(t)) of capacitor 102 or capacitor 103 for identical capacitors, i.e., comb structures, is described in first approximation as:

$$C_{102}(t)=n\varepsilon^{*}(((1_{0}+\delta 1(t)))^{*}h)/d=C_{0}+\delta C(t) \quad (1)$$

$$C_{103}(t)=n^{*}\varepsilon^{*}(((1_{0}+\delta 1(t)))^{*}h)/d$$

$$=C_{0}-\delta C(t) \quad (2)$$

where:

$1_0$: basic overlapping of the movable comb structure with the corresponding stationary comb structure;

$\delta 1$: deflection of the movable comb structure;

h: height of the movable comb structure;

d: gap distance of the movable comb structure from the stationary comb structure, i.e., the distance (ideally always identical) between adjacent "teeth" or fingers of movable and stationary comb structures;

n: number of overlapping fingers of movable and stationary comb structures;

$\varepsilon$: dielectric constant of the medium, air in particular, between the movable and the stationary comb structures;

$\delta C$: time-dependent change in capacitance as a function of the deflection of the movable comb structure relative to the stationary comb structure;

$C_0$: resting capacitance, i.e., the capacitance of the capacitor formed by the movable comb structure and the stationary comb structure when the movable comb structure is stationary.

It holds that:

$$\delta C/C_{0}=\delta 1/1_{0} \quad (3)$$

i.e., the relative change in capacitance due to deflection of the movable comb structure is equal to $\delta 1/1_0$. The movable comb structure is acted upon by an alternating voltage $U_{HF}$ from a device (not shown) at frequency $f_{HF}$ via terminal 105. Frequency $f_{HF}$ of alternating voltage $U_{HF}$ is much higher than operating frequency $f_{sensor}$ supplied to the sensor via the driving comb structures. For example, frequency $f_{HF}$ of alternating voltage $U_{HF}$ corresponds approximately to 16 times operating frequency $f_{sensor}$, operating frequency $f_{sensor}$ amounting to approx. 1.5 kHz, for example. It is self-evident that this information applies only to examples of one specific sensor.

An alternating voltage having a frequency $f_{HF}$ is applied to terminals 104 and 106, frequency $f_{HF}$ being amplitude-modulated with the operating frequency of sensor $f_{sensor}$.

The time-dependent capacitance of first capacitor 102 is converted by C/U converter 112 into a corresponding electric voltage, amplified by amplifier 113 and sent to adder 110. The capacitance of second capacitor 103 showing an inverse time dependence in comparison with the capacitance of the first capacitor is converted by C/U converter 114 into a corresponding electric voltage, amplified by amplifier 115 and also sent to adder 110.

The alternating voltage delivered by adder 110 is sent to demodulator 111. Demodulator 111 demodulates, i.e., multiplies the alternating voltage delivered by adder 110 by the sign of alternating voltage $U_{HF}$.

Adder 110 forms the difference between the electric signals in first signal path 107 and second signal path 108, amplified by gain factor g by amplifier 113 and amplifier 115; therefore, the alternating voltage delivered by demodulator 111 at its output is:

$$U_{FE}=2*g*\delta C/C_{RK}*U_{HF}=2*g*\delta 1/1_{0}*C_{0}/C_{RK}*U_{HF} \quad (4)$$

where:

g: gain factor;

$C_{RK}$: feedback capacitance of C/U converter 112 and identical C/U converter 114;

$U_{HF}$: alternating voltage $U_{HF}$;

$U_{FE}$: the alternating voltage delivered by demodulator 111 after demodulation, i.e., multiplication by sign $U_{HF}$, this means that, due to the differentiation of the electric signals at the output of first signal path 107 and second signal path 108 performed by adder 110, the common-mode component caused by resting capacitance $C_0$ is eliminated.

An essential aspect of the present invention is providing measures so that $U_{FE}$ is independent of the resting capacitance $C_0$ of the sensor, which is subject to certain fluctuations due to manufacturing tolerances.

According to a preferred embodiment of the present invention, both electric voltage $U_{LV1}$ between the output of C/U converter 112 and amplifier 113 and electric voltage $U_{LV2}$ between the output of C/U converter 114 and amplifier 115 are picked up, electric voltage $U_{LV1}$ being sent to the first input of adder 120 and electric voltage $U_{LV2}$ being sent to the second input of adder 120.

The electric voltage delivered by C/U converters 112 and 114 at their outputs is:

$$U_{LV1,LV2}=(C_{0}+/-\delta C)/C_{RK}+U_{HF} \quad (5)$$

The result of addition of the electric voltages performed by adder 120 is an output voltage $U_{add}$ of adder 120, for which it holds that:

$$U_{add}=f((C_{0}+\delta C)+(C_{0}-\delta C))=f(C_{0}) \quad (6)$$

i.e., the output voltage of adder 120 is a function of resting capacitance $C_0$.

Output voltage $U_{add}$ of adder 120 is sent to regulator 119, preferably an I regulator delivering an output voltage $U_I$ which is sent to an input of modulator 118 and also to the regulating terminal of anplifier 121.

Modulator 118 also receives alternating voltage $U_{HF}$, and the output signal delivered by modulator 118 goes to a first terminal of each capacitor 116 and 117, both having a capacitance $C_I$. The second terminal of capacitor 116 is connected to the input of C/U converter 112 in signal path 107, and the second terminal of capacitor 117 is connected to the input of C/U converter 114 in signal path 108.

Capacitors 116 and 117 receive a voltage via regulator 119 such that the output signal of adder 120 has an amplitude of approx. 0 volt, i.e., capacitors 116 and 117 almost completely compensate resting capacitance $C_0$ of the respective sensors.

Common-mode regulating apparatus 109 (CMRA) therefore responds only to common-mode signals, i.e., direct voltage signals, at the input end. The output of regulator 119 changes its voltage in regulating operation until there is no longer a common mode signal at the input of adder 120. This condition is met when the following holds:

$$U_{HF}*C_0=-U_I*C_I \quad (7)$$

i.e., $U_I=-C_0/C_I*U_{HF}$ (8)

i.e., voltage $U_1$, is directly proportional to resting capacitance $C_0$.

Amplifier 121 performs an amplification $g_{var}$ of voltage $U_{FE}$ as a function of the particular resting capacitance via voltage $U_I$ applied to amplifier 121, for which the following equation holds:

$$g_{var}=C_I/C_0 \quad (9)$$

For electric voltage U delivered at the output of amplifier 121, this yields:

$$U=2*g*\delta 1/1_0*C_I/C_{RK}*U_{HF} \quad (10)$$

where $\delta C/C_0 = \delta 1/1_0$ (see equation (3)),
i.e., the voltage applied at the output of amplifier 121, i.e., at output A, is independent of resting capacitance $C_0$ of the particular sensor whose vibrational amplitude is to be regulated. Voltage U and thus change $\delta 1$ in the path of the movable sensor element depend only on low-tolerance voltage $U_{HF}$, which is determined by the electronic regulation and/or measurement devices, and basic overlap $1_0$. Basic overlap $1_0$ is settable with a high precision, however, in particular in the case of a micromechanical sensor manufactured from semiconductor layers by using planar silicon processes.

Voltage U delivered by amplifier 121 is sent to phase quadrature device 201, which sends voltage U, 90° out of phase, to the input of amplifier 202 and sends amplified out-of-phase voltage U to an input of output stage 203.

Furthermore, voltage U delivered by amplifier 121 is sent to the input of rectifier 206 via input E, i.e., the input of the phase quadrature device. Setpoint voltage $U_{setpoint}$ amplified by amplifier 209 is subtracted by adder 208 from voltage U rectified by rectifier 206, and the output signal of adder 208 is sent to the input of regulator 207. Regulator 207 changes the voltage at its output until its input voltage is virtually zero. Regulator 207, preferably a PI regulator and/or an automatic gain control regulator (AGC) controls output stage 203 so that the output stage delivers a voltage to the drive comb structures of the sensor (not shown) via terminals 204 and 205, so that the vibrational amplitude of the oscillating sensor element, i.e., the oscillating weight, is constant and virtually at a maximum.

Figure 4:
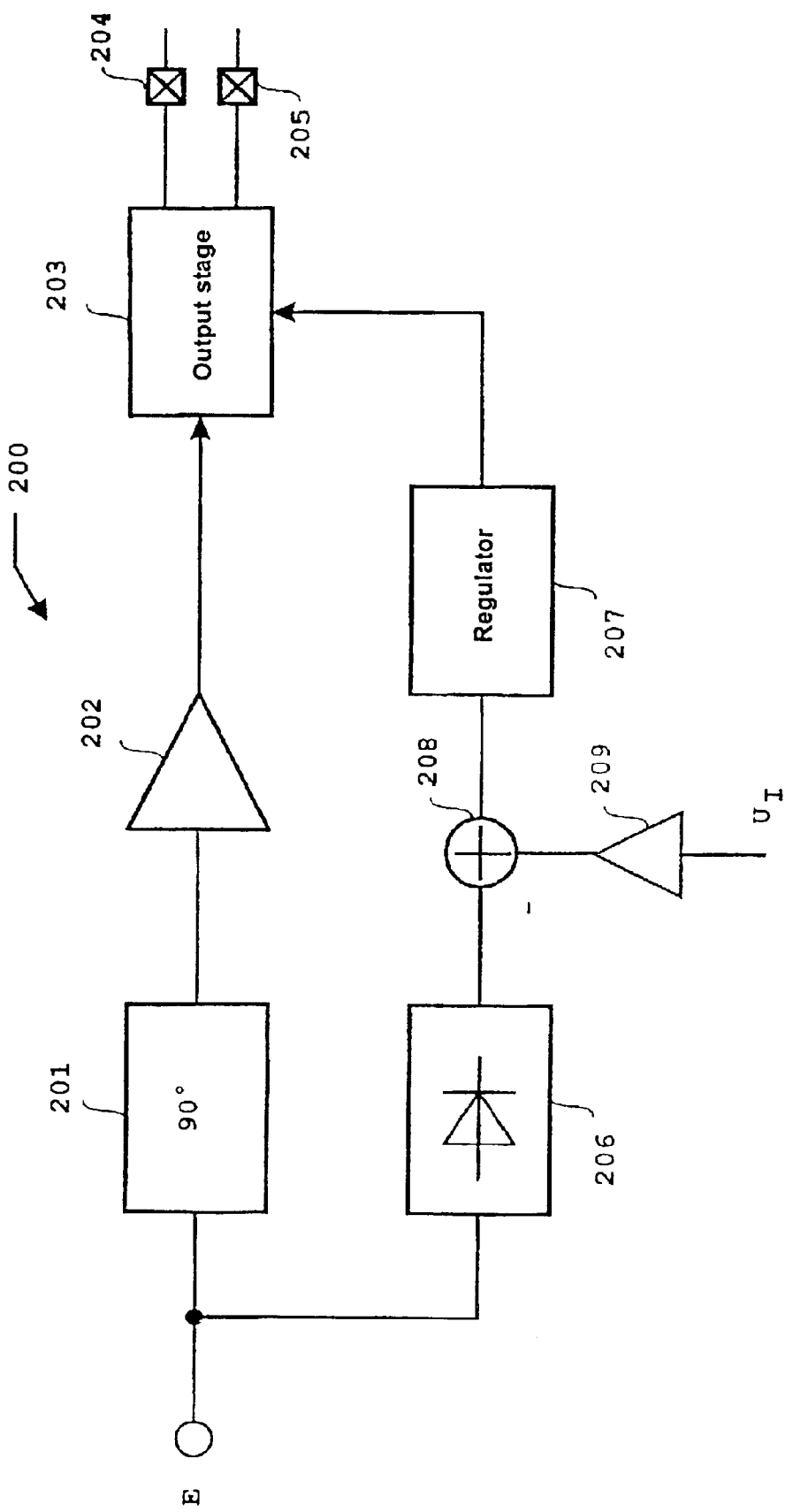
FIG. 4 shows the second part of the schematic diagram of the second embodiment of a sensor-independent vibration amplitude regulating device according to the present invention.

The second embodiment of the vibration amplitude regulating device according to the present invention as illustrated in FIGS. 3 and 4 differs from the first embodiment illustrated in FIGS. 1 and 2 in that instead of setpoint voltage $U_{setpoint}$ voltage $U_I$ delivered at the output of regulator 119 is applied to the second input of adder 208; furthermore, voltage $U_I$ is not applied to amplifier 121 in the second embodiment, so the amplifier implements a constant gain $g_{const}$. The following thus holds for the output voltage of amplifier 121:

$$U=2*g*\delta 1/1_0*C_0/C_{RK}*U_{RF}*g_{const} \quad (11)$$

The regulator, i.e., AGC regulator 207 changes its output voltage until output voltage U of amplifier 121 corresponds to AGC reference input variable $U_I$ (or a variable proportional thereto). As in the first embodiment, this also means that the amplitude of vibration of the oscillating sensor element, i.e., the oscillating weight, is independent of resting capacitance $C_0$, which is subject to manufacturing tolerances.

Gap distance manufacturing tolerances due to overetching now no longer have any effect on the deflection and thus the speed of the movable sensor element. A more complex and thus more expensive adjustment of each finished sensor to adjust the desired deflection is no longer necessary when using the sensor-independent vibrational amplitude regulating device according to the present invention.

As explained above, the sensor-independent vibration amplitude regulating device according to the present invention regulates the vibration amplitude of the oscillating weight of a capacitive sensor such as a rotational rate sensor in particular. It is self-evident that the vibrational amplitude regulating device described here may also be used in a modified form to regulate the amplitude of vibration of the oscillating weight of an inductive sensor, e.g., such as a rotational rate sensor in particular. Such a modified form of the vibration amplitude regulating device according to the present invention takes into account in particular the fact that instead of capacitances, there are inductances which are subject to manufacturing tolerances, in an inductive sensor.

LIST REFERENCE NOTATION 100 first part of the schematic diagram of the vibration amplitude regulating device according to the present invention
101 schematic diagram of the comb structures of a capacitive rotational rate sensor for sensing the deflection of its oscillating weight
102 capacitor
103 capacitor
104 terminal
105 terminal
106 terminal
107 first signal path
108 second signal path
109 common-mode regulating apparatus (CMRA)
110 adder
111 demodulator
112 C/U converter
113 amplifier
114 C/U converter
115 amplifier
116 capacitor 117 capacitor
118 modulator
119 regulator
120 adder
121 amplifier
200 second part of the schematic diagram of the vibration amplitude regulating device according to the present invention
201 phase quadrature device
202 amplifier
203 output stage
204 terminal
205 terminal
206 rectifier
207 regulator
208 adder
209 amplifier

What is claimed is:

1. A device for generating an electric voltage whereby a vibration of a body of at least one of a capacitive sensor and an inductive sensor capable of vibration is induced, comprising:
a voltage generating device that generates an electric voltage that is proportional to at least one of a resting capacitance and an induction of a magnetic field of the at least one of the capacitive sensor and the inductive sensor.

2. The device as recited in claim 1, wherein:
the at least one of the capacitive sensor and the inductive sensor includes a capacitive micromechanical rotational rate sensor.

3. The device as recited in claim 1, wherein:
the voltage generating device forms part of a regulating circuit for regulating an amplitude of the vibration of the body.

4. The device as recited in claim 3, wherein:
the voltage generating device includes a common-mode regulating apparatus that responds only to a common-mode signal at an input end.

5. The device as recited in claim 4, wherein at least one of:
the common-mode regulating apparatus includes a first adder and a regulator, and
an output of the regulator changes a voltage thereof in regulating operation until virtually no common-mode signal is applied at an input of the regulator.

6. The device as recited in claim 5, wherein:
the regulator includes an I regulator.

7. The device as recited in claim 5, wherein:
the at least one of the capacitive sensor and the inductive sensor includes two elements whose capacitance is variable over time in opposite directions, the two elements being formed in part by the body capable of vibration, and a change in capacitance of the two elements being detected separately in a first signal path and a second signal path.

8. The device as recited in claim 7, wherein:
an output signal of the first adder is sent to the input of the regulator,
a first input of the first adder picks up a first signal in the first signal path, and
a second input of the first adder picks up a second signal in the second signal path.

9. The device as recited in claim 8, further comprising:
a modulator, wherein at least one of:
an output signal of the regulator is sent to an input of the modulator, the modulator modulating the output signal of the regulator in accordance with a frequency of a voltage supplied to the two elements.
an output signal of the modulator is sent to a first terminal of a first capacitor having a first capacitance and to a first terminal of a second capacitor having a second capacitance,
a second terminal of the first capacitor is electrically connected to the first signal path, and
a second terminal of the second capacitor is electrically connected to the second signal path.

10. The device as recited in claim 9, further comprising:
an amplifier including a first input to which the output signal of the regulator is sent and for amplifying a voltage applied thereto by a factor that depends on the at least one of the capacitive sensor and the inductive sensor and that is one of proportional to and equal to a quotient of the first capacitance and the resting capacitance.

11. The device as recited in claim 10, further comprising:
a second adder, and
a demodulator, wherein:
an output signal of the first signal path is sent to a first input of the second adder,
an output signal of the second signal path is sent to a second input of the second adder, and
an output signal of the second adder is demodulated by a demodulator and sent to the amplifier for amplification.

12. The device as recited in claim 11, wherein:
the demodulator performs a demodulation using the frequency of the voltage supplied to the two elements.

13. The device as recited in claim 12, wherein:
an output voltage of the amplifier is kept constant.

14. The device as recited in claim 13, wherein:
the output voltage of the amplifier is proportional to the resting capacitance of the at least one of the capacitive sensor and the inductive sensor, and
an electric voltage is a reference variable of the regulating circuit for regulating the amplitude of the vibration of the body capable of vibration.

* * * * *

UNITED STATES PATENT AND TRADEMARK OFFICE
CERTIFICATE OF CORRECTION

PATENT NO. : 6,765,305 B2
DATED : July 20, 2004
INVENTOR(S) : Jens Mohaupt et al.

It is certified that error appears in the above-identified patent and that said Letters Patent is hereby corrected as shown below:

<u>Column 3,</u>
Line 38, change "…=$n\varepsilon$ *((( …" to -- …=$n^*\varepsilon$ *((( … --

<u>Column 5,</u>
Line 36, change "$g_{var}=C_1/C_0$" to -- $g_{var}=C_1/C_0$ --
Line 40, change "$C_1/C_{RK}*U_{HF}$" to -- $C_1/C_{RK}*U_{HF}$ --

Signed and Sealed this

Third Day of May, 2005

JON W. DUDAS
*Director of the United States Patent and Trademark Office*